US Patent [19] Oien

[11] Patent Number: 4,735,985
[45] Date of Patent: Apr. 5, 1988

[54] CHIP- AND ABRASION-RESISTANT POLYURETHANE COATING COMPOSITION HAVING IMPROVED ADHESION

[75] Inventor: Han T. Oien, Roseville, Minn.

[73] Assignee: Minnesota Mining and Manufacturing Company, St. Paul, Minn.

[21] Appl. No.: 941,561

[22] Filed: Dec. 11, 1986

Related U.S. Application Data

[63] Continuation-in-part of Ser. No. 720,976, Apr. 8, 1985, abandoned.

[51] Int. Cl.⁴ ........................ C08L 27/06; C08L 75/04
[52] U.S. Cl. ...................................... 524/315; 524/317; 524/507; 525/123
[58] Field of Search ........................ 524/507, 317, 315; 525/123

[56] References Cited

U.S. PATENT DOCUMENTS

| | | | |
|---|---|---|---|
| 3,857,090 | 4/1975 | Levy | 260/22 |
| 4,081,493 | 3/1978 | Kazama et al. | 260/859 |
| 4,254,168 | 3/1981 | Monson | 427/409 |
| 4,408,026 | 10/1983 | Pusineri | 525/123 |
| 4,499,124 | 2/1985 | Pusineri | 525/123 |

FOREIGN PATENT DOCUMENTS

| | | | |
|---|---|---|---|
| 655097 | 1/1963 | Canada | 525/123 |
| 1093933 | 12/1960 | Fed. Rep. of Germany | 524/507 |
| 57-111361 | 7/1982 | Japan | 524/507 |
| 802335 | 2/1981 | U.S.S.R. | 524/507 |
| 1062238 | 12/1983 | U.S.S.R. | 524/507 |

*Primary Examiner*—C. Warren Ivy
*Attorney, Agent, or Firm*—Donald M. Sell; James A. Smith; Richard Francis

[57] ABSTRACT

The invention is a coating composition which includes fully reacted, solvent-soluble polyurethane, an adhesion-promoting amount of vinyl chloride-vinyl ester copolymer, and a solvent for the polyurethane and the copolymer to make the composition coatable. A method of coating is also provided comprising applying to a surface the coating composition and permitting the coating composition to dry. The invention further provides a surface coated with the dry coating composition.

9 Claims, No Drawings

CHIP- AND ABRASION-RESISTANT POLYURETHANE COATING COMPOSITION HAVING IMPROVED ADHESION

This is a continuation-in-part of application Ser. No. 720,976 filed Apr. 8, 1985, now abandoned.

TECHNICAL FIELD

This invention relates to a composition for coating a substrate with a chip- and abrasion-resistant polyurethane coating, a method of coating using the same and to a substrate coated with the coating.

BACKGROUND

Notwithstanding a considerable portion of roadways being paved, both in the United States and in foreign countries, there exists a serious paint chipping problem which continues to plague motor vehicle owners, caused by gravel and other small particles on the road bed being thrown against the painted surfaces of such vehicles. The same problem plagues the owners of other painted structures such as boats, trailers, airplanes, trains, tanks, towers, and the like, although the impacting particles may be from other sources.

The chipping problem is perhaps most noted by the owners and manufacturers of automobiles, particularly those having areas wherein the body of the automobile tends to curve inwardly immediately behind the front and/or rear wheels. This situation causes particles such as gravel from streets and other roadway surfaces to be carried on the surface of the tires and impacted against the painted surface of the automobile. Since the paved roadways typically have small gravel particles and other hard particles on their surface and unpaved roads usually always contain such material, the propelling of high speed particulate material against the painted surface of the automobile is unavoidable. While means have been suggested for imposing a shield such as a mud flap or mud guard between the automobile wheel and the painted surface, this solution has not been completely satisfactory because it detracts from the vehicle's aesthetic appearance and adds yet another cost to the already high price of the automobile.

Attempts have been made to produce tougher, more chip-resistant paint for automobiles, but these have not been generally completely satisfactory. One recognized solution is to cover all or parts of the finished surface of the automobile with a protective coating.

Automobile surfaces are typically finished or covered with pigmented paints such as acrylic enamel, acrylic lacquer or nitrocellulose lacquer. These materials produce coatings which are difficult to overcoat with protective materials.

A useful protective coating composition will be chip- and abrasion-resistant, have good adhesion to the painted surface, be clear, smooth (i.e., without surface roughness) and indistinguishable when applied to the areas being protected over the painted surface. Prior to the present invenion, none of the surface protective coatings has such characteristics.

While polyurethane lacquers containing non-reactive polyurethane in solvent are preferred condidates for use as protective coatings because such polyurethanes are tough and impact resistant, they do not adhere adequately to conventional painted automobile surfaces because they lack free or available reactive groups such as isocyanate groups which would normally provide attachment sites to promote good adhesion. Thus, such coatings are prone to failure as evidenced by peeling, cracking, checkering or the like. Moreover, it is preferred to employ such a protective coating as a transparent, smooth-surface coating as some coatings tend to discolor, or provide a coated surface which is not smooth but instead rough or otherwise unattractive.

Because of its higher cost, polyurethane is typically not employed to cover the entire surface to be painted. The chip-resistant coatings are customarily added to those locations which would be more susceptible to chipping, e.g., on the automobile body immediately behind the wheels, the leading portion of the automobile such as the front of the hood and other front portions of the body. Protective coatings must therefore adhere to conventional automobile painted surfaces such as those based on acrylic resins.

Various attempts have been made to produce chip-resistant polyurethane protective coatings. One example is that disclosed by Monson (U.S. Pat. No. 4,254,168), assigned to the assignee of the present application, which discloses a pigmented polyurethane protection coating but which does not contain fully reacted polyurethane. Other examples include Levy (U.S. Pat. No. 3,875,090) which discloses a high impact and abrasion resistant coating composition comprising a mixture of a partially hydrolyzed vinyl chloride-vinyl acetate copolymer, an alkyd and an isocyanate terminated urethane prepolymer. This composition depends upon curing of the prepolymer instead of solvent evaporation.

While so-called "solution vinyls" (vinyl chloride-vinyl ester copolymers) have been reactively combined with precursor materials for producing polyurethane, the resultant polymerized material is typically not clear and is difficult to apply because of the required reaction. Such a polyblend is disclosed by Kazama et al (U.S. Pat. No. 4,081,493), teaching a resin composition having resistance to hydrolysis which comprises a polyblend of a polyvinyl chloride resin, a polyester-urethane, a lead stabilizer, and one or more polyhydric alcohols.

SUMMARY OF THE INVENTION

The present invention provides the coating composition which has the impact resistance and chip- and abrasion-resistance of polyurethane yet which has excellent adhesion to automobile finishes such as those based upon acrylic materials. The coating is typically applied over the acrylic finish but, since such acrylic materials also have excellent adhesion to the coating compositions, it may be employed as an undercoating beneath the acrylic coating. The composition is preferably free of materials which require chemical reaction for use. The coating produced with the composition is impact, chip, and abrasion resistant, and preferably clear so that it is indistinguishable on the automobile surface in the areas where it is used as a top coating yet it resists delamination from such a surface.

The coating composition comprises fully reacted, solvent-soluble aliphatic polyurethane, an adhesion-promoting amount of vinyl chloride-vinyl ester copolymer, and solvent for the polyurethane and the copolymer to make the composition coatable. The preferred adhesion-promoting amount of the vinylchloride-vinyl ester copolymer comprises from about 5 to about 60 parts (most preferably 5 to 30 parts) by weight based on 100 parts of the composition on a dry, solvent-free basis. This level of vinyl chloride-vinyl ester copolymer is needed to obtain enhanced adhesion to acrylic surfaces such as the acrylic surfaces of automotive finishes. The preferred vinylchloride vinyl ester copolymer is a carboxyl-modified vinylchloride-vinyl ester. The preferred vinyl chloride-vinyl ester copolymer is vinylchloride-vinyl acetate copolymer.

The term "fully reacted, solvent-soluble polyurethane" means a non-reactive polyurethane which is soluble in solvent and which lacks free or available reactive groups such as isocyanate groups which would normally provide attachment sites to promote good adhesion.

The invention also provides a method of coating a surface comprising applying to the surface the coating composition described above and drying the coating composition to provide a chip- and abrasion-resistant coating. The invention further provides a coated surface with a coating comprising fully reacted, solvent-soluble polyurethane and an adhesion promoting amount of vinylchloride-vinyl ester copolymer.

DETAILED DESCRIPTION

Examples of useful vinyl chloride-vinyl ester copolymers for the practice of the present invention include:

A vinyl chloride/vinyl acetate/maleic acid copolymer (86/13/1 weight percent) having a glass transition temperature of 74° C., a number average molecular weight of 21,000, and inherent viscosity of 0.50, and a specific gravity of 1.35 (available under the registered trademark "UCAR" solution vinyl VMCH from the Union Carbide Corporation) hereinater referred to as VMCH".

A vinyl chloride/vinyl acetate copolymer (90/4 weight percent) which also contains a hydroxyl-containing comonomer (2.3 weight percent OH) having glass transition temperature of 79° C. and a number average molecular weight of 23,000, an inherent viscosity of 0.53, and a specific gravity of 1.39 (available under the registered trademark "UCAR" solution vinyl VAGH from the Union Carbide Corporation) hereinafter referred to as "VAGH".

The vinyl chloride/vinyl acetate copolymer (86/14 weight percent) having an inherent viscosity of 0.50, a specific gravity of 1.35, a glass transition temperature of 72° C. and a number average molecular weight of 20,000 (available from the Union Carbide Corporation under the registered trademark "UCAR" solution vinyl VYHH) hereinafter referred to as "VYHH".

Useful fully reacted polyurethane/solvent combinations for the practice of the present invention include the following lacquers.

Polyurethane lacquer (hereinafter referred to as "Polyurethane Lacquer AV1122EA" manufactured by Chemische Werke Huls AG of West Germany. This lacquer consists of 30 parts fully reacted polyester-based aliphatic polyurethane having a weight average molecular weight of 42,000 dissolved in 70 parts of a solvent consisting of equal parts by weight of ethanol and ethyl acetate. The lacquer has a Brookfield viscosity of 500 cps employing a No. 2 spindle at 20 rpm and 25° C. The polyurethane consists of, on a mole basis, 21% isophorone diisocyanate, 30% neopentyl glycol, 18% hexane diol, and 31% adipic acid.

Polyurethane lacquer (hereinafter referred to as "Polyurethane Lacquer 24-117") available under the trade designation "24-117" from Chemical Components, Inc., New Jersey. This lacquer consists of 30 parts fully reacted polyester-based aliphatic polyurethane dissolved in 70 parts of a solvent consisting of equal parts by weight of ethanol and ethyl acetate. This lacquer has a Brookfield viscosity of 500 cps employing a No. 2 spindle at 20 rpm and 25° C. The polyurethane has a weight average molecular weight of about 29,000 and consists of, on a mole basis, 19% isophorone diisocyanate, 37% adipic acid and 44% 1,4-butane diol.

Polyester-based aliphatic polyurethane lacquer (hereinafter referred to as "Polyurethane Lacquer QI3710") available under the trade designation QI3710 from K. J. Quinn Company, Massachusetts consisting of 25 parts by weight polyurethane in 75 parts by weight of a solvent mixture of isopropyl alcohol, toluene, and xylene. The lacquer has a Brookfield viscosity of 500 cps employing a No. 2 spindle at 20 rpm and 25° C.

Aromatic polyurethane resins should be avoided since they typically yellow on exposure to sunlight and would discolor on the surface of an acrylic finish, causing a discoloration of the acrylic surface which may be readily apparent, particularly where the coating is applied over only a portion of the entire acrylic surface.

The solvents which may be added to the liquid composition defined in the present invention are those hydrocarbons and oxygenated hydrocarbon solvents customarily added to acrylic lacquers or enamels or nitrocellulose lacquers. Such solvents should be selected to be compatible with the resin and lacquer compositions defined herein. Examples of such useful solvents are ethyl acetate, butyl acetate, "Cellosolve" acetate and methyl ethyl ketone.

Flow control agents may also be added to level the coated film. An example of such an agent is available under the tradename "Dow Corning" 56 from the Dow Corning Corporation. Other conventional additives may also be employed. When the composition is used as an undercoating beneath the acrylic coating, pigments, fillers and the like may also be included.

The coating composition of the invention may be applied by any known compatible technique such as spraying, brush or roller application, dipping, etc. The preferred method of application is by spraying, most preferably by using a container which includes the coating composition and a suitble aerosol propellant and which is fitted with a spray nozzle.

TESTING

Crosshatch Adhesion Test

The coating compositions of the present invention were tested for adhesion to various painted substrates. The test is that described in ASTM D 3359-78-B entitled Standard Methods for Measuring Adhesion by Tape Test. The test method assesses the adhesion of coating films to metallic substrates by applying and removing pressure sensitive adhesive tape over cuts made in a film of the coating composition. The test panel is first finished with a conventional lacquer such as white refinishing lacquer and then abraded with fine grit abrasive paper such as that available under the trade designation "Trio-M-ite Fre-Cut" No. 320 from the Minnesota Mining and Manufacturing Company. The abraded metal panel is then air dried for at least 24 hours at room temperature. A crosshatch pattern with 6 cuts in each direction is then made in the coating to the substrate, pressure-sensitive adhesive tape is applied over the crosshatch and removed, and adhesion is evaluated by comparison with descriptions and illustrations. The cutting tool is a sharp razor blade, scalpel, knife or other cutting device which has a cutting edge in good condition. A cutting guide is used to insure straight cuts. The tape is 1 inch (25 mm) wide semi-transparent pressure-sensitive tape with an adhesion strength of 36 plus or minus 2.5 oz/in. (40 plus or minus 2.8 g/mm) with when tested in accordance with ASTM Test Method B 1000.

In the test, an area free of blemishes and minor surface imperfections on the paint coating is selected. Care should be taken to insure that the surface is clean and dry. Extremes in temperature or relative humidity which may affect the adhesion of the tape or the coating should be avoided. Two sets of six parallel cuts each, with cuts one set being at 90° to cuts in the other set, are made in the coating, each about 20 mm long so as to intersect near the middle of the test panel. The cut should penetrate through the coating to the substrate in one steady motion. The metal should be visible through the coating. After cutting, the film is lightly brushed to remove detached flakes or ribbons of coatings. A piece of tape 75 mm long is removed from the roll and placed with the center of tape at the intersection of the cuts with the tape running in the same direction as one set of the cuts. The tape is smoothed in place by finger in the area of the cuts and then rubbed firmly with a eraser on the end of a pencil. Within ninety plus or minus 30 seconds of application, the tape is removed by creasing a free end and pulling it off rapidly without jerking back upon itself at as close an angle of 180° as possible. The cut area is then inspected for removal of coating from the substrate and rated for adhesion according to the following scale:

5B The edges of the cuts are completely smooth; none of the squares of the lattice is detached.
4B Small flakes of the coating are detached at intersections; less than 5% of the area is affected.
3B Small flakes of the coating are detached along edges and at intersections of cuts. The area affected is 5 to 15% of the lattice.
2B The Coating has flaked along the edges and on parts of the squares. The area affected is 15 to 35% of the lattice.
1B The coating has flaked along the edges of cuts in large ribbons and whole squares have detached. The area affected is 35 to 65% of the lattice.
0B Flaking and detachment worse than Grade 1.

An excellent coating will have a Crosshatch Adhesion value of 5B. A commercially acceptable coating will have a Crosshatch Adhesion value of 3B-5B.

Chipping Test

Certain coatings were also tested for chip resistance using the chip resistance test described in the Society of Automotive Engineer's Technical Report J400. The test consists of projecting a standardized road gravel by means of a control air blast onto a suitable test panel. The testing apparatus is contained in a box on wheels, called a gravelometer, designed to contain road gravel, a test holder, and a gravel projecting mechanism. The gravel was water-worn gravel rather than crushed limestone or rock, which will pass through ⅜ inch (9.5 mm) screen when graded, but be retained on ⅜ inch (9.5 mm) screen. The projecting mechanism, located in the front of the test panel, consists of an air nozzle in the base of a pipe T. The stem of the pipe T points upward and is connected to a funnel into which the gravel is poured. The gravel, falling into the air blast, is projected toward and impacts upon the test panel, which is usually held perpendicular to the impinging gravel. All testing is conducted at room temperature. After gravel impact, masking tape is applied to remove any loose chips remaining on the panel, and the degree of chipping is determined by counting the number and size of all chips.

The test panel is the same as that described hereinbefore in the description of the Crosshatch Adhesion Test which has been coated with the test coating and permitted to dry and age for a minimum of 24 hours at room temperature before testing. The test panels are conditioned for a minimum of one hour at the specified test temperature prior to testing. In the test five pints of gravel is applied over a 25 to 50 second period of time employing an air pressure of about 25 psi (1.75 kg/cm$^2$) as the propelling means.

The number of chips is a numerical rating selected from the range of 0 to 10 as described in Table I to indicate the number of chips in a 4 inch (10 cm) square area.

TABLE I

| Rating Number | Number of Chips |
| --- | --- |
| 10 | 0 |
| 9 | 1 |
| 8 | 2–4 |
| 7 | 5–9 |
| 6 | 10–24 |
| 5 | 25–49 |
| 4 | 50–74 |
| 3 | 75–99 |
| 2 | 100–149 |
| 1 | 150–250 |
| 0 | 250 |

The size of chips are rated A through D, according to the table set out below:

TABLE II

| Rating Letter | | |
| --- | --- | --- |
| A | <1 mm | (<approximately 0.03 in.) |
| B | 1.3 mm | (approximately 0.03. 0.12 in.) |
| C | 3.6 mm | (approximately 0.12. 0.25 in.) |
| D | >6 mm | (>approximately 0.25 in.) |

Thus the most desirable chipping test rating is 10-A and the least desirable is 0-D. It should be noted that more than one result in each category is possible.

EXAMPLES

The invention is illustrated by the following examples, wherein all parts are by weight unless otherwise stated.

Example 1

| Weight (g) | Ingredients |
| --- | --- |
| 4 | VMCH |
| 43.8 | Ethylacetate |
| 16.9 | Butylacetate |
| 31.8 | Polyurethane lacquer 24–117 |
| 21.1 | Ethanol |

A coating composition was prepared direcly in a 16 oz. (473 ml) aerosol can of the above ingredients. The ethylacetate, butylacetate and vinyl chloride-vinyl acetate copolymer were placed into the aerosol can. The can was agitated on a paint shaker for 30 minutes until a clear solution resulted. The polyurethane lacquer and ethanol were then added followed by aerosol propellant consisting of 14 ml isobutane and 14 ml N-propane. The aerosol can was then sealed and a dispenser applied and the can was agitated on the paint shaker for an additional 30 minutes.

Examples 2–3

Examples 2–3 were prepared in the same manner as Example 1 except the vinyl chloride-vinyl ester copolymer was substituted as indicated in Table 1.

To show the uniqueness of the invention in that other elastomeric type additives will not provide improved adhesion in the polyurethane coating composition, Control Examples A–K were prepared in the same manner as Example 1. No additive was used in Control A and other elastomeric-type additives were used in Control Examples B–K. Most of the additives of the Control Examples were incompatible with the polyurethane lacquer, resulting in phase separation when the two were mixed. Of the control additives which were compatible, no improved Crosshatch Adhesion was noted as indicated in Table I below.

TABLE 1

| Ex. No. | Additive Generic Name | Trademark | Compatible | Crosshatch Adhesion |
|---|---|---|---|---|
| 1 | Solution vinyl | VMCH | Yes | 5B |
| 2 | " | VAGH | " | 3B |
| 3 | " | VYHH | " | 5B |
| A | None | None | — | 0B |
| B | Polyester resin | "Polylite"[1] 31-006 | Yes | 0B |
| C | " | "Polylite"[1] 31-039 | " | 0B |
| D | " | "Vitel"[2] 222 | No | 0B |
| E | polystyrene | None | No | 0B |
| F | acrylic resin | "Acryloyd"[3] A-21-LV | No | 0B |
| G | Cellulose acetate butyrate | CAB ½ sec. | No | — |
| H | Polyester Resin | "Vitel"[2] VPE83 | No | — |
| I | Saturated alicyclic hydrocarbon | "Arkon" M90 | No | — |
| J | Hydrogenated hydrocarbon | "Super Nirez" 5100 | No | 0B |
| K | Ethyl Cellulose | N-Type | No | 0B |

[1]Trademark of Reichhold Chemical Co.
[2]Trademark of the Goodyear Company
[3]Trademark of the Rohm and Haas Co.

Example 4

| Weight (g) | Ingredients |
|---|---|
| 3.8 | Ethyl acetate |
| 1.7 | "Cellosolve" acetate |
| 0.4 | VMCH |
| 3.8 | Polyurethane lacquer QT3710 |
| 2.7 | "Cellosolve" acetate |
| 2.6 | Ethanol |

The first three ingredients, ethyl acetate, "Cellosolve" acetate and VMCH, were mixed in a small vial on a paint shaker for fifteen minutes until a clear solution was obtained. The remaining ingredients were then added on the vial, and the contents were mixed well and bar coated to a white refinishing acrylic lacquer panel that had been abraded with 320 grit abrasive paper (available from the Minnesota Mining and Manufacturing Company under the registered trademark "Tri-M-ite Fre-Cut" No. 320). The coating was permitted to air dry for 24 hours at room temperature and then the Crosshatch Adhesion was determined and found to be 5B. A control, employing the same formulation except omitting the VMCH, showed 0B Crosshatch Adhesion under the same evaluation conditions.

Table IV reveals the Chip Rating and Crosshatch Adhesion values as a function of "VMCH" modifier content in the amount by weight shown with the balance of 100 being polyurethane "24-117". The measured surface area in mm² of paint removed as a result of chipping, reported as "Chip Area" is also shown in Table IV. The higher the Chip Area the more severe the chipping problem.

TABLE IV

| VMCH Modifier (%) | Chip Rating | Crosshatch Adhesion | Chip Area (mm²) |
|---|---|---|---|
| 4.8 | 2-A | 0B | 2 |
| 9.1 | 1-A | 3B | 2 |
| 16.7 | 2-A; 9-C | 3B | 3 |
| 23.2 | 2-A | 5B | 3 |
| 28.7 | 5-A; 8-B; 9-C | 5B | 3 |
| 49 | 5-A; 8-B; 6-C; 9-D | 5B | 61 |
| 58.9 | 6-A; 8-B; 9-C; 8-D | 5B | 78 |
| 74 | 5-A; 6-B; 8-C; 7-D | 5B | 96 |

As shown in Table IV, the Crosshatch Adhesion values improve significantly as the amount of "VMCH" modifier is increased.

Table V shows the Chip Area of certain commercially available clear protective coatings.

TABLE V

| Commercial Coating | Chip Area (mm²) |
|---|---|
| "Chip Shield"[1] | 533 |
| "Chip Guard"[2] | 276 |
| "Dietzler Delclear" DAU 75[3] | 226 |

[1]The tradename of an acrylic coating composition available from Taylor Made Products, Inc., Akron, Ohio
[2]The tradename of an acrylic coating composition available from SEM Products, Inc., Belmont, California
[3]The tradename for an acrylic polyurethane coating composition available from PPG Industries, Dietzler Automotive Finishes, Troy, Michigan.

A commercially acceptable coating composition for aesthetic reasons will have a very low Chip Area value with a Crosshatch Adhesion value of 3B–5B. It should be noted that all of the commercial coating compositions have a Chip Area value far in excess of the Chip Area Value of coatings according to the present invention.

Various modifications may be made in the disclosed compositions, coatings and method without departing from the scope of the claims.

I claim:

1. A composition capable upon drying by solvent evaporation of providing a clear chip- and abrasion-resistant coating having improved adhesion to acrylic surfaces, said composition comprising:
   (a) fully reacted solvent-soluble polyurethane derived from an aliphatic diisocyanate;
   (b) an adhesion-promoting amount of vinyl chloride-vinyl ester copolymer; and
   (c) solvent for said polyurethane and said copolymer to make said composition coatable
wherein said adhesion-promoting amount of said vinyl chloride-vinyl ester copolymer comprises from about 5 to about 30 parts by weight based on 100 parts of the composition on a dry solvent-free basis.

2. The composition of claim 1 wherein said vinyl chloride-vinyl ester copolymer is modified by the addition of about 1 to 2% maleic acid comonomer.

3. The composition of claim 1 wherein said vinyl chloride-vinyl ester copolymer is vinyl chloride-vinyl acetate copolymer.

4. The composition of claim 1 having a Brookfield viscosity of about 50-500 cps employing a No. 2 spindle at 20 rpm and 25° C.

5. The composition of claim 1 wherein said fully reacted solvent-soluble polyurethane has a weight average molecular weight of about 18,000-50,000.

6. The composition of claim 1 wherein said solvent is a blend of an alcohol having from 1-6 carbon atoms and an ester having from 1-6 carbon atoms.

7. The composition of claim 1 wherein said vinyl chloride-vinyl acetate copolymer comprises about 60-90 mole % vinyl chloride and 10-40 mole % vinyl ester.

8. An acrylic surface coated with a clear coating comprising fully reacted, solvent-soluble aliphatic polyurethane and an adhesion-promoting amount of vinyl chloride-vinyl ester copolymer wherein said adhesion-promoting amount of said vinyl chloride-vinyl ester copolymer comprises from about 5 to about 30 parts by weight based on 100 parts of the composition on a dry solvent-free basis.

9. The surface of claim 8 wherein said vinyl chloride-vinyl ester copolymer is carboxyl-modified vinyl chloride-vinyl acetate copolymer.

* * * * *

UNITED STATES PATENT AND TRADEMARK OFFICE
CERTIFICATE OF CORRECTION

PATENT NO. : 4,735,985

DATED : April 5, 1988

INVENTOR(S) : Oien

It is certified that error appears in the above-identified patent and that said Letters Patent is hereby corrected as shown below:

On the first page of the patent after [75] delete "Han T. Oien" and insert in its place --Hans T. Oien--.

Column 4, line 42, delete "suitble" and insert in its place --suitable--.

Signed and Sealed this

Twentieth Day of June, 1989

Attest:

DONALD J. QUIGG

*Attesting Officer*  *Commissioner of Patents and Trademarks*